3,331,882
SEPARATING ALPHA MONOOLEFINS USING A STEAMED FAUJASITE MOLECULAR SIEVE
William Judson Mattox, Baton Rouge, La., assignor to Esso Research and Engineering Company, a corporation of Delaware
No Drawing. Filed Oct. 29, 1964, Ser. No. 407,523
11 Claims. (Cl. 260—677)

The present invention is directed to an improved process for selectively purifying alpha (terminal) monoolefins while inhibiting double bond isomerization thereof.

It is already known that certain porous substances, such as silica gel, activated char and zeolites have certain selective adsorption characteristics useful in resolving a hydrocarbon mixture into its components. Thus silica gel is used to remove aromatic hydrocarbons from non-aromatic hydrocarbons, and activated charcoals are used in separating olefins from mixtures with paraffins. Similarly "Type A" molecular sieves, which are certain crystalline zeolites having a $SiO_2:Al_2O_3$ mol ratio of about 2:1 and pore openings of about 4 to 5 Angstroms, have the capacity of retaining and thus separating n-hydrocarbons from branched chain and cyclic hydrocarbons.

Another type of zeolitic molecular sieve, frequently referred to as "Type X" has been used successfully to selectively remove aromatics from hydrocarbon mixtures containing them. The "Type X" sieves differ from the "Type A" sieves in selectivity (nature of hydrocarbon selectively removed) and X-ray diffraction pattern. "Type X" sieves also are characterized by a silica to alumina mol ratio of <3:1, e.g., 2.5:1.

There are many other highly desirable separations, however, that these porous materials, "Type A" and "Type X" sieves are not capable of making effectively. For example, it is a desideratum to separate linear alpha monoolefins from mixtures of the same with polyolefins, esp. conjugated diolefins, aromatics, and other hydrogen deficient hydrocarbons. "Type A" sieves are not capable of conducting such a separation effectively because even though they allow some surface adsorption of aromatics along with their primary selectivity for N-paraffin removal; "Type A" sieves do not remove aromatics selectively, nor do they effectively remove conjugated diolefins. "Type X" sieves remove aromatics selectively, but demonstrate very poor ability to selectively remove polyolefins, esp., conjugated diolefins, from linear aliphatic alpha monoolefins.

Recently a process has been developed for selectively removing both aromatics and polyolefins, esp., the difficult to remove conjugated diolefins, from hydrocarbon mixtures containing the same with alpha monoolefins. This newly developed process for purifying alpha monoolefins employs a crystalline faujasite sorbent having a $SiO_2$ to $Al_2O_3$ mol ratio of at least 3:1 and effective pore openings of 6 to 15 Angstrom units. These sorbents have excellent capacity to remove both aromatics and polyolefins, esp. conjugated diolefins, selectively. Consequently, these faujasite sorbents having a $SiO_2:Al_2O_3$ mol ratio of at least 3:1 are superior to both "Type A" and "Type X" sieves in selectively purifying alpha monoolefins.

While the above described recently developed faujasite alpha monoolefin purification process represents a significant step forward in the art, the use thereof involves a troublesome drawback in that at the elevated temperatures employed to purify the alpha monoolefins, double bond isomerization thereof is found to occur, e.g., converting the terminal (alpha) monoolefins to internal, e.g., Type II monoolefins, when using sorbents having a $SiO_2:Al_2O_3$ mole ratio of >3:1 and esp. those which contain a significant concentration of sodium ions. The present invention overcomes this drawback by allowing purification of the alpha monoolefins while inhibiting double bond isomerization thereof.

The improved process of this invention is conducted by contacting the natural or synthetic faujasite sorbent with steam at temperatures ranging from about 800 to 1600° F. for time periods ranging from five minutes to about four hours (with shorter time periods coinciding with the higher temperatures and vice versa) while employing steam atmospheres containing at least about 80% by weight steam. After the steam pretreatment, excess moisture is removed by heating the steam-treated sorbent at temperatures of from about 700 to about 1000° F. while flowing a dry, inert gas(es), e.g., air, nitrogen, carbon monoxide, carbon dioxide, etc., therethrough until the water content in the off gas reaches an acceptable level for use of the sorbent in the olefin separation and purification process contemplated herein, e.g., anywhere from less than 0.1 to essentially 0.0 percent by weight. After the steam-treated sorbent has been dried in the manner specified above, it is then ready for direct use in purification of the alpha monoolefins.

The purification process is then conducted by contacting the steam-treated and dried faujasite sorbent with the olefin containing hydrocarbon feedstock at temperatures ranging from about 30° F. to a temperature below that at which significant feedstock cracking and/or other deleterious conversions occur, and thereafter recovering essentially unisomerized alpha monoolefins therefrom.

While the exact mechanism involved in securing the advantageous effect of purification while inhibiting double bond isomerization is not clearly known, the treatment of the faujasite sorbent with steam at elevated temperatures in accordance with the present invention irreversibly deactivates those sites on the faujasite sorbent which assist or catalyze isomerization. This advantageous result is achieved without appreciably affecting the sorptive capacity of the sorbent employed in the purification process. A significant and highly advantageous feature of the present invention is that the isomerization tendency of the faujasite sorbents is irreversibly inhibited. This is borne out by the fact that the tendency to cause isomerization does not recur even though repeated sorption-desorption cycles are conducted using the steam-treated faujasite sorbents.

Any natural or synthetic crystalline faujasite sorbents can be employed which produce selective purification of alpha monoolefins in the manner specified hereinabove. These crystalline faujasite sorbents are alkali and alkaline earth alumino silicates having effective pore openings (pore diameters) of about 6 to 15 Angstrom units. Said faujasite should have a silica-to-alumina mol ratio of at least 3:1, and preferably the mol ratio of silica-to-alumina in the faujasite sorbents ready for steam treatment and subsequent use in purifying mono alpha olefins ranges from about 3 to 7:1, as such faujasites are not only readily regenerable by the use of steam, but also possess superior capacity for removal of diolefins, esp. conjugated diolefins, as compared to sorbents having $SiO_2:Al_2O_3$ mol ratios <3:1, e.g., of 2.5:1. More preferably, the mol ratio of $SiO_2:Al_2O_3$ ranges from 4 to 6:1. In accordance with this invention, the use of synthetic crystalline faujasites is preferred as the naturally occurring faujasites are in sparse supply and hence far more expensive than the synthetic faujasites. In general, these crystalline alumino silicate faujasites contain a substantial portion of an alkali metal and/or alkaline earth metal oxide, e.g., sodium oxide, potassium oxide, calcium oxide, etc. In place of or in addition to the above mentioned oxides, the faujasite sorbents employed herein can contain other alkali metal and/or alkaline earth oxides, e.g., rubidium oxide, cesium oxide, strontium oxide, etc. Preferably, however, the sorbent contains at least one oxide of an alkali metal heavier than lithium, viz, sodium, potassium, rubidium or cesium.

In general, the chemical composition of the crystalline alumino-silicate faujasite sorbents will follow the below expressed chemical formula (wherein the components of the faujasites are expressed in terms of mols):

$$M_{2/n}O \cdot Al_2O_3 x CiO_2$$

wherein M is an alkali metal or alkaline earth metal selected from the group consisting of lithium, sodium, potassium, rubidium, cesium, barium, strontium, magnesium, and calcium; $n$ is the valence of the metal cation, and $x$ has a value of at least 3, and preferably ranges from 3 to 7.

The above chemical formula indicates the actual chemical composition of the prepared active crystalline faujasite sorbents suitable for employment in accordance with the purification process of this invention, and not a solution from which it is prepared. Natural and synthetic faujasite sorbents of the type whose use is contemplated herein are known, and the specific chemical nature of the faujasite sorbent can be varied widely within the purview of this invention. The following faujasite sorbents can be cited as exemplary of those which can be used according to this invention:

| Component: | Mol percent |
|---|---|
| $Na_2O$, $K_2O$, CaO, etc. | 10 to 20 |
| $SiO_2$ | 60 to 80 |
| $Al_2O_3$ | 10 to 20 |
| $SiO_2:Al_2O_3$ | (1) |

[1] Mol ratio 3 to 7 : 1.

The faujasite sorbents, such as those exemplary sorbents coming within the above described typical compositions, are well known in the art.

Typical processes involve crystallization from reaction mixtures containing $Al_2O$ as sodium aluminate alumina sol and the like; $SiO_2$ as sodium silicate and/or silica gel and/or silica sol; and $Na_2O$ as sodium hydroxide. Careful control is kept over the soda ($Na_2O$) concentration of the mixture, as well as the proportions of silica-to-alumina and soda-to-silica, the crystallization period, etc., in order to obtain the desired product. A conventional scheme for preparing crystalline alumino-silicate zeolites of the faujasite type would be as follows:

Colloidal silica, such as commercial Ludox (supplied by E. I. du Pont de Nemours & Co., Inc.) is mixed with a solution of sodium hydroxide and sodium aluminate at ambient temperatures to produce a reaction mixture having the following molar ratios of reactants:

| Reactants, mol ratio: | |
|---|---|
| $Na_2O/SiO_2$ | 0.28 to 0.45 |
| $SiO_2/Al_2O_3$ | 7 to 30 |
| $H_2O/NA_2O$ | 20 to 60 |
| $SiO_2/Al_2O_3$ in product | (1) |

[1] 3 to 7, preferably 4 to 6.

The reaction mixture may then be allowed to digest at ambient temperatures for up to 40 hours or more in order to aid crystallization, after which period it is heated at 180 to 250° F., e.g., 200 to 220° F., for a sufficient time to crystallize the product, e.g., 24 to 200 hours or more. The crystalline, metallo alumino-silicate is separated from the aqueous mother liquor by decantation or filtration and washed to recover a crystalline product.

A typical procedure for preparing synthetic faujasite sorbents suitable for use in accordance with this invention is given hereinbelow.

A solution of (1) commercial sodium aluminate containing 38 wt. percent $Na_2O$, 38 wt. percent $Al_2O_3$, and 24 wt. percent $H_2O$, and (2) sodium hydroxide containing 75 wt. percent $Na_2O$ in water was added to (3) a commercially available aqueous sol in colloidal silica containing about 30 wt. percent $SiO_2$ and a weight ratio of soda-to-silica equal to 1:285 ("Ludox" solution supplied by E. I. du Pont de Nemours & Co.), under rapid stirring conditions at ambient temperatures, e.g., about 75° F., to form an essentially homogeneous mixture. The homogeneous reaction mixture was aged for up to about 10 hours at ambient temperature and then heated to and held at a temperature of about 200 to 215° F., e.g., 210° F., until the product sufficiently crystallized. The crystallization period was determined by the length of time necessary to produce maximum crystallinity of product, as measured by periodically withdrawing a sample and analyzing for crystallinity by X-ray diffraction techniques. The crystallization step was terminated by quenching the reaction mixture with large volumes of cold water. The crystalline product was then separated from the mother liquor by filtration, thoroughly water-washed until the wash water had a pH of about 9.3, and finally dried at a temperature of about 265° F.

The silica-to-alumina mole ratio of the product sorbent will depend not only upon the proportion of ingredients used, but also upon the preparation procedure employed. Therefore, using the above described typical preparation procedure, a sodium form synthetic faujasite sorbent having a mole ratio of approximately 4.2:1 was prepared using the following ingredients: 6870 grams of 97% NaOH, 1513 grams of sodium aluminate. 37.6 kg. of silica sol, and 27 liters of water. This material analyzed, after drying, 14.0% $Na_2O$, 58.6% $SiO_2$, and 23.4% $Al_2O_3$. On a mole basis, this analysis corresponds to 0.98 $Na_2O$:1.00 $Al_2O_3$:4.2 $SiO_2$.

To produce a silica-to-alumina ratio of about 5.3, the above amounts of ingredients were adjusted as follows: 6000 grams of NaOH, 1700 grams of sodium aluminate, 38.6 kg. of silica sol, and 21.5 liters of water. This faujasite analyzed, after drying, 13.7% $Na_2O$, 66.8% $SiO_2$, and 21.3% $Al_2O_3$. On a mole basis this corresponds to 1.07 $Na_2O$:1.00 $Al_2O_3$:5.3 $SiO_2$.

Additional information on preparation of synthetic faujasite sorbents having silica-to-alumina mole ratios of 3 to 7:1 is contained in S.N. 354,981, filed on Mar. 26, 1964 in the name of W. J. Mattox, the disclosure of which is incorporated herein by reference.

According to the present invention the pretreatment of the above described faujasite sorbents is conducted by heating said sorbents in atmospheres containing at least about 80 wt. percent steam at temperatures ranging from about 800 to 1600° F. for time periods ranging from about five minutes to about four hours. Usually steam atmospheres will contain in excess of 90 wt. percent steam, and temperatures of about 900 to 1500° F. are used for steam treatment times ranging from about 10 minutes to 3 hours with the higher temperatures coinciding with the shorter exposure times and vice versa. Preferably, the steam pretreatment of the faujasite sorbent is conducted using steam atmospheres containing in excess of 98 wt. percent steam at temperatures of 1000 to 1400° F. for treatment periods ranging from about 15 minutes to 2 hours.

The steam pretreatment of the faujasite sorbents can be conducted in a static manner, i.e., with a static steam atmosphere of at least 80 wt. percent steam at the treatment temperatures and for the time specified above. However, steam is usually flowed through the faujasite sorbent bed using flow rates which can range from 0.01 to about 1.0 wt. parts of steam per wt. parts of sorbent per hour. Usually, steam flow rates of 0.01 to about 0.8 w./w./hr. are employed, and preferably steam is flowed through the faujasite sorbent bed at rates of from 0.01 to 0.5 w./w./hr.

After the faujasite sorbent has been treated with steam in the manner set forth above, excess moisture is removed therefrom by heating at temperatures of about 700 to about 1000° F. while flowing dry, inert gas therethrough, usually at flow rates changing from about 1 to 100 volumes of dry inert gas per volume of sorbent bed per hour The drying procedure is conducted until the water content in the off gas reaches an acceptable level for the olefin separation and purification process, viz., the water content of the off gas ranges anywhere from less than 0.1 wt. percent to essentially 0.0 wt. percent.

After removal of excess moisture from the steam-pretreated sorbent as specified above, the sorbent is ready for direct use in purifying alpha monoolefins.

The olefin purification process as contemplated herein is then conducted by contacting the hydrocarbon feedstock containing a predominant amount of a mixture of polyolefins, e.g., mostly diolefins, and alpha monoolefins, with the steam-treated faujasite sorbent having excess moisture removed therefrom. These hydrocarbon mixtures usually contain in excess of 70 wt. percent of the polyolefin-alpha monoolefin mixtures. The present invention works especially well in purifying alpha monoolefins present in hydrocarbon streams obtained by the wax cracking of higher molecular weight paraffins. These wax-cracked olefin mixture-containing feeds generally have the below described compositional constitution:

Usual components: Usual weight concentrations
Monoolefins:
  Linear _____ 60–95
  Cyclic _____ 1–10
Diolefins:
  Conjugated _____ 0.5–5
  Nonconjugated _____ 1–15
  Aromatics _____ 0.3–6
  Saturates (paraffins and cycloparaffins) _ 0.1–1

The olefin purification process can be conducted conveniently at temperatures ranging from about 30 to about 800° F., usually ranging from about 60 to about 700° F., and preferably ranging from about 100 to about 650° F. These hydrocarbon feedstocks are contacted with steam-pretreated faujasite sorbents at feed flow rates which can range from about 0.1 to about 12 weight parts of hydrocarbon feed per weight parts of faujasite sorbent per hour. Usually the feed flow rates at which the hydrocarbon mixtures are contacted with the steam-pretreated faujasite sorbents range from 0.2 to 8 w./w./hr., and preferably from 0.5 to 5 w./w./hr. This contact of the hydrocarbon feedstock with the sorbent effects adsorption of the contaminants from the alpha monoolefins, thereby allowing the alpha monoolefins to pass through essentially unisomerized. In order to regenerate the sorptive capacity of the faujasite sorbents and recover the adsorbed aromatic and diolefin materials therefrom, the sorbent is desorbed employing temperatures lying within the ranges specified hereinabove for the sorption cycle (thereby recouping the aromatic and polyolefin materials and regenerating the sorbent for further sorption-desorption cycles).

Any convenient desorption procedure can be used, e.g., ammonia desorption, steam desorption, etc., without any appreciable reduction in the sorptive capacity of the faujasite sorbents or reduction in inhibition of isomerization.

The present invention will be described in greater detail by the following examples.

Example I

Tests made with crude $C_8$ petrolatum olefin feed and faujasites of different silica-to-alumina mol ratios have shown very pronounced differences in adsorptive capacity and in olefin isomerization activity. The results of these tests are summarized below. The contacting operation, wherein the $C_8$ petrolatum olefin feed was contacted with the synthetic faujasites, was conducted at a temperature of 300° F. and at the below indicated respective feed flow rates for from 1 to 1.5 hours.

EFFECTS OF $SiO_2$:$Al_2O_3$ MOL RATIO ON ADSORPTIVE CAPACITY OF FAUJASITE SORBENTS FOR $C_8$ OLEFIN CONTAMINANTS AND ISOMERIZATION OF PURIFIED PRODUCT (TYPE I MONO ALPHA OLEFINS)

| | Feed | Faujasite $SiO_2$:$Al_2O_3$ Ratio | | |
|---|---|---|---|---|
| | | 2.5 | 4.2 | 5.3 |
| Feed Rate (w./w./hr.) | | 0.34 | 0.39 | 0.38 |
| OCTENE EFFLUENT | | | | |
| Monoolefin Analysis at | | 0–0.23 w./w. | 0–0.45 w./w. | 0–0.27 w./w. |
| Percent Type I | 93 | 90 | 68 | 84 |
| Percent Type II | 3 | 4 | 25 | 13 |
| Percent Type III | 3 | 1 | 2 | 0 |
| Percent Type IV | 1 | 5 | 5 | 3 |
| Percent Conjugated Diolefins: | | | | |
| At 0.05 w./w | 2.5 | 0.02 | <0.04 | |
| At 0.10 w./w | | 0.15 | <0.04 | |
| At 0.23 w./w | | 2.2 | <0.04 | |
| Percent Aromatics (at 0–0.3 w./w.) | 3.2 | 0 | 0 | 0 |

Although the low (2.5 mol ratio $SiO_2$:$Al_2O_3$) ratio faujasite showed very little isomerization activity and removed all aromatics, the capacity of this faujasite sorbent for removing conjugated diolefins was quite limited. Correlated experiments conducted using the faujasite sorbent having a silica-to-alumina ratio to 2.5:1 indicated that no more than about 0.05 to 0.1 w./w. of conjugated diolefin-free effluent could be produced using this faujasite under such contacting conditions. The removal of conjugated diolefins is important, however, as these conjugated diolefins when present in the product stream have a tendency to polymerize and undergo condensation reactions thus reducing the economic value of the product stream of mono alpha olefins when it contains even small amounts of these conjugated diolefins.

The data for the faujasite sorbents having $SiO_2$:$Al_2O_3$ mol ratios of at least 3:1 indicate that the effluents produced with these faujasites contained not more than trace amounts of these objectionable conjugated diolefins when using feed flow rates of up to about 0.5 w./w./hr. or even higher.

Thus, it would be highly desirable to be able to use the higher silica-alumina mol ratio containing faujasite sorbents were it not for their tendency to cause isomerization of the purified mono alpha olefin (Type I) product.

This isomerization drawback is effectively inhibited by steam treating the faujasite sorbents as indicated in the examples below, thus permitting the use of the faujasite sorbents having silica-to-alumina mol ratios of at least 3:1 to effect the desired purification without appreciable olefin isomerization.

Example II

The faujasite sorbent of Example I having a silica-to-alumina mol ratio of 4.2:1 was steamed for two hours at 1000° F. employing a steam flow rate of 0.3 to 0.4 w./w./hr. and a steam atmosphere of 98+ wt. percent steam. Following this steam pretreatment, excess moisture is removed by heating in air at a temperature of 1000° F. for 2 hours using an air purge (flow) rate of 10 to 12 v./v./hr. Then the olefin purification process was repeated as in Example I. The steam-treated sorbent essentially retained its original adsorptive capacity and in addition produced a purified octene effluent having a Type I olefin (mono alpha olefin) content of approximately 84%.

Example III

Comparative testing was conducted using the steam pretreatment technique of Example II on the faujasite sorbents having a $SiO_2$:$Al_2O_3$ mol ratio of 4.2 only at temperatures of 1200 and 1400° F., respectively. The purified octene effluent contained 86 and 85 percent, respectively, of Type I (alpha) olefins.

What is claimed is:

1. A process for separating alpha monolefins from hydrocarbon feedstocks containing them while inhibiting double bond isomerization of said alpha monoolefins which comprises contacting a faujasite sorbent having a silica to aluminum mole ratio of at least 3:1 with steam at temperatures ranging from about 800 to about 1600° F. in steam atmospheres containing at least about 80 wt. percent steam, and thereafter contacting a hydrocarbon feedstock containing predominantly a mixture of polyolefins and alpha monoolefins with said steam treated faujasite sorbent at temperatures ranging from about 30° F. to a temperature below that at which significant feedstock cracking and other deleterious conversions occur, and recovering essentially unisomerized alpha monoolefins.

2. A process as in claim 1 which includes recovering said polyolefins by desorption of said faujasite sorbent.

3. A process as in claim 2 wherein said desorption is accomplished by passing steam in contact with said faujasite sorbent at elevated temperatures.

4. A process as in claim 1 wherein said faujasite sorbent is an alkali metal oxide containing faujasite sorbent containing at least one alkali metal oxide selected from the group consisting of sodium oxide and potassium oxide.

5. A process as in claim 1 wherein the steam atmosphere contains at least 90 wt. percent steam.

6. A process as in claim 5 wherein said faujasite sorbent is contacted with steam at temperatures ranging from about 1000 to 1400° F.

7. A process as in claim 1 wherein said steam is flowed through said faujasite sorbent at flow rates ranging from 0.01 to about 1.0 w./w./hr.

8. A process as in claim 1 wherein said steam-treated faujasite sorbent is heated at temperatures ranging from about 700 to about 1000° F. prior to contact with said alpha monoolefin containing hydrocarbon feedstock.

9. A process as in claim 1 wherein said contact of said alpha monoolefin containing hydrocarbon feedstock with said steam-treated faujasite sorbent is conducted at temperatures ranging from about 30 to about 800° F.

10. A process as in claim 9 wherein said contact is conducted employing hydrocarbon feed flow rates ranging from about 0.1 to about 12 w./w./hr.

11. A process as in claim 1 wherein said faujasite sorbent has effective pore openings ranging from about 6 to about 15 Angstrom units.

References Cited

UNITED STATES PATENTS

| | | | |
|---|---|---|---|
| 2,988,503 | 6/1961 | Milton et al. | 260—677 |
| 3,224,167 | 12/1965 | Jones | 252—455 |

DELBERT E. GANTZ, *Primary Examiner.*

H. LEVINE, *Assistant Examiner.*